(12) United States Patent
Simmons

(10) Patent No.: US 8,823,656 B2
(45) Date of Patent: Sep. 2, 2014

(54) TOUCH TRACKING ACROSS MULTIPLE TOUCH SCREENS

(75) Inventor: Martin Simmons, Southampton (GB)

(73) Assignee: Atmel Corporation, San Jose, CA (US)

( * ) Notice: Subject to any disclaimer, the term of this patent is extended or adjusted under 35 U.S.C. 154(b) by 308 days.

(21) Appl. No.: 12/871,687

(22) Filed: Aug. 30, 2010

(65) Prior Publication Data

US 2012/0050177 A1 Mar. 1, 2012

(51) Int. Cl.
*G09G 5/00* (2006.01)

(52) U.S. Cl.
USPC ............. 345/173; 345/1.1; 345/1.2; 345/156

(58) Field of Classification Search
USPC .......... 345/173, 174, 175, 176, 177, 178, 1.1, 345/1.2, 1.3, 2.1, 2.2, 2.3, 3.2, 3.4, 156; 715/863
See application file for complete search history.

(56) References Cited

U.S. PATENT DOCUMENTS

| 6,545,669 | B1 * | 4/2003 | Kinawi et al. ................. 345/173 |
| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,539,384 | B2 * | 9/2013 | Hinckley et al. ............... 715/863 |
| 2007/0075915 | A1 * | 4/2007 | Cheon et al. .................... 345/1.1 |
| 2008/0309635 | A1 | 12/2008 | Matsuo |
| 2009/0315854 | A1 | 12/2009 | Matsuo |
| 2010/0156656 | A1 * | 6/2010 | Duarte et al. ............. 340/815.4 |
| 2010/0182265 | A1 * | 7/2010 | Kim et al. ...................... 345/173 |
| 2010/0225601 | A1 * | 9/2010 | Homma et al. ............... 715/863 |
| 2010/0229089 | A1 * | 9/2010 | Narita ........................... 715/702 |
| 2010/0259494 | A1 * | 10/2010 | Kii ................................. 345/173 |
| 2011/0018821 | A1 * | 1/2011 | Kii ................................. 345/173 |
| 2011/0291964 | A1 * | 12/2011 | Chambers et al. ............. 345/173 |
| 2012/0084678 | A1 * | 4/2012 | Sirpal et al. .................... 715/761 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076612 | A1 | 3/2013 | Myers |

FOREIGN PATENT DOCUMENTS

WO WO 2012/129247 9/2011

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kent Chang
*Assistant Examiner* — Nelson Rosario
(74) *Attorney, Agent, or Firm* — Baker Botts LLP

(57) ABSTRACT

The examples enable tracking of a touch gesture that may extend across a discontinuity between two or more touch screens of a mobile device or the like.

20 Claims, 6 Drawing Sheets

TOUCH TRACKING ACROSS MULTIPLE TOUCH SCREENS

BACKGROUND

A position sensor is a device that can detect the presence and location of a touch that results from a user's finger or some other object such as a stylus. In some instances, a position sensor is overlaid on a display screen; and the sensor detects touches within the display area. In a touch sensitive display application, the position sensor allows a user to interact directly with what is displayed on the screen, rather than indirectly with the displayed objects by using a mouse or touchpad. By way of example, position sensors can be attached to or provided as part of computers, personal digital assistants (PDA), satellite navigation devices, mobile telephones, portable media players, portable game consoles, public information kiosks, automatic teller machines (ATMs) and point of sale systems. Position sensors have also been used as control panels on various appliances.

There are a number of different types of position sensors that are used as part of a touch screen. Examples include, but are not limited to, resistive touch screens, surface acoustic wave touch screens, and capacitive touch screens. A capacitive touch screen, for example, may include an insulator coated with a transparent conductor in a particular pattern. An object, such as a user's finger or a stylus, that touches or is brought into close proximity to the surface of the screen causes a detectable change in capacitance. This change in capacitance is sensed and its location can be determined by a controller that processes the detected change in capacitance.

In many applications, the touch screen and associated circuitry can detect a touch gesture as well as a touch at a particular location. Detection of a gesture can be determined by monitoring multiple touches over time. In recent years, touch sensitive position sensors have been used in mobile devices, which often have two touch screens that slide apart or flip open like a book. The two or more screens can function together as a single larger touch screen. In these two-screen devices, detection of a gesture across the gap between the two screens is lost. Thus, the gesture will not be tracked as a single gesture. The loss of detection results in the gesture being interpreted as a separate gesture on each of the screens.

SUMMARY

The following disclosure describes examples that enable tracking of a touch gesture that may extend across a discontinuity between two or more touch screens of a mobile device or the like.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

The examples provide for tracking a gesture that spans between two or more touch sensitive screens, even where the screens may be separated by a gap. A gesture that began on a first screen is tracked across the discontinuity caused by the gap between the screens and continues as a gesture on the second screen.

The examples shown and described implement a capacitive form of touch sensing. In one exemplary configuration sometimes referred to as a mutual capacitance configuration, an array of conductive drive electrodes or lines and conductive sense electrodes or lines can be used to form a touch sensitive screen having a number of capacitive nodes. A node is formed at each intersection of drive and sense electrodes. Although referred to as an intersection, the electrodes cross but do not make electrical contact. Instead, the sense electrodes are capacitively coupled with the drive electrodes at the intersection nodes. Although capacitive sensing is shown and described, other types of sensing can be used.

Figure 1A:
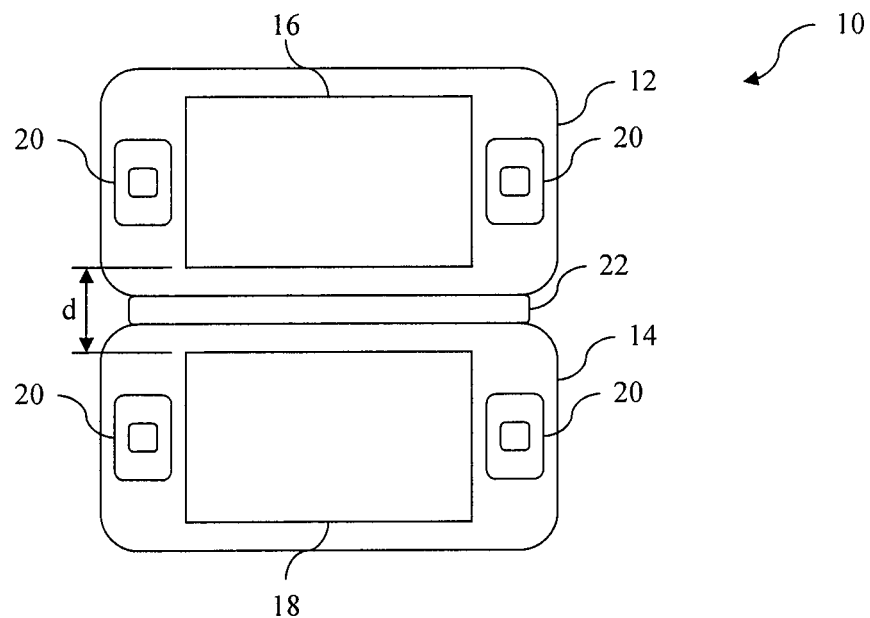
FIG. 1A illustrates schematically a mobile device having two touch sensitive screens.
Figure 1B:
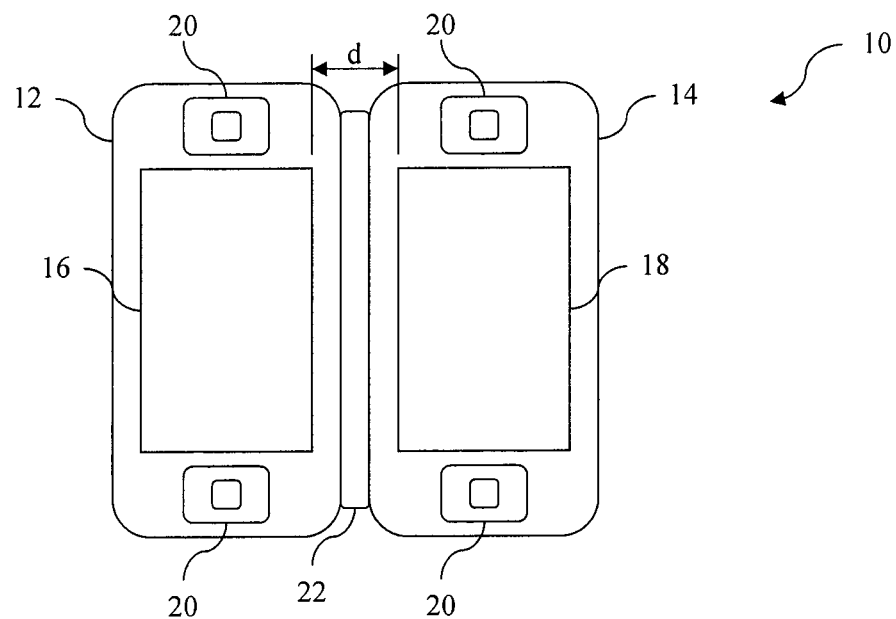
FIG. 1B illustrates schematically another mobile device having two touch sensitive screens.

Reference now is made in detail to the examples illustrated in the accompanying figures and discussed below. FIG. 1A illustrates schematically a mobile device 10 having two touch sensitive screens 16, 18 each being housed in a respective housing. The mobile device 10 includes a first portion 12 provided with the touch sensitive screen 16 and a second portion 14 provided with the touch sensitive screen 18. Both the first and second portions 12, 14 include buttons 20 and are linked via a connector 22. FIG. 1B illustrates schematically another mobile device 10, the same as or similar to that of FIG. 1A but rotated 90 degrees. The connector 22 may be a hinge which allows one portion of the device to rotate relative to the other portion of the device, in which case, the mobile device 10 of FIGS. 1A and 1B opens and closes much like a book.

Figure 2A:
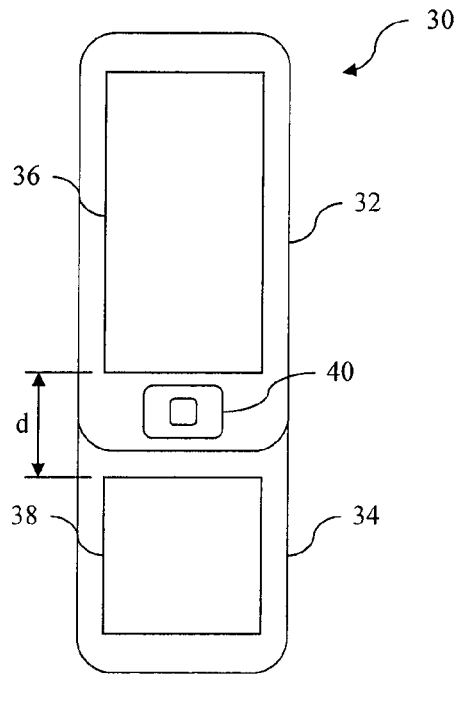
FIG. 2A illustrates schematically another mobile device having two touch sensitive screens.
Figure 2B:
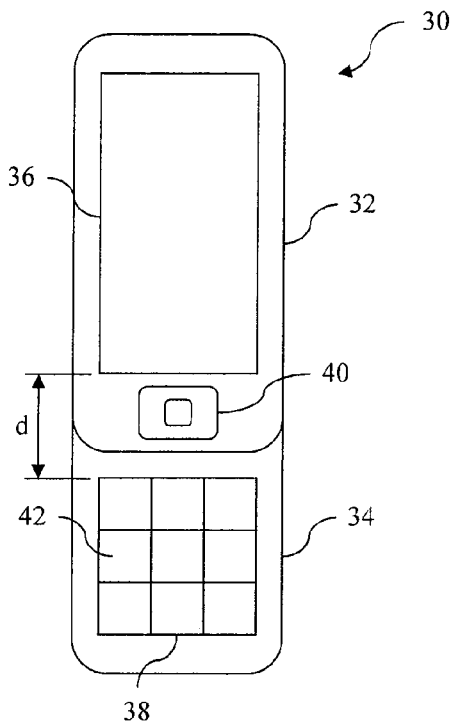
FIG. 2B illustrates schematically another mobile device having two touch sensitive screens.

FIGS. 2A and 2B illustrate schematically another mobile device 30 having two touch sensitive screens 36, 38. The mobile device 30 includes a first portion 32 provided with a first touch sensitive screen 36 and a second portion 34 provided with a second touch sensitive screen 38. The first portion 32 also includes a button 40. In FIGS. 2A and 2B, the first and second portions 32, 34 can be slid apart (as illustrated). When slid together, the second portion 34 is provided behind the first portion 32, such that the second touch sensitive screen 38 is no longer visible. In the example of FIG. 2B, the second touch sensitive screen 38 is provided as an array of touch sensitive keys 42.

The associated electronics detect multiple touches and can associate a set of touches on more than one screen as a single gesture. If the gesture moves from one screen to another, the supporting electronics should treat the two touch screens as a single touch screen in this type, of gesture detection application although the two screens are separated by the space D. As stated before, the gesture results from the detection of multiple touches. Thus, to track the gesture across more than one screen, the detection of touches at the first screen are combined with the detection of touches at the second screen to detect one single gesture.

Figure 3A:
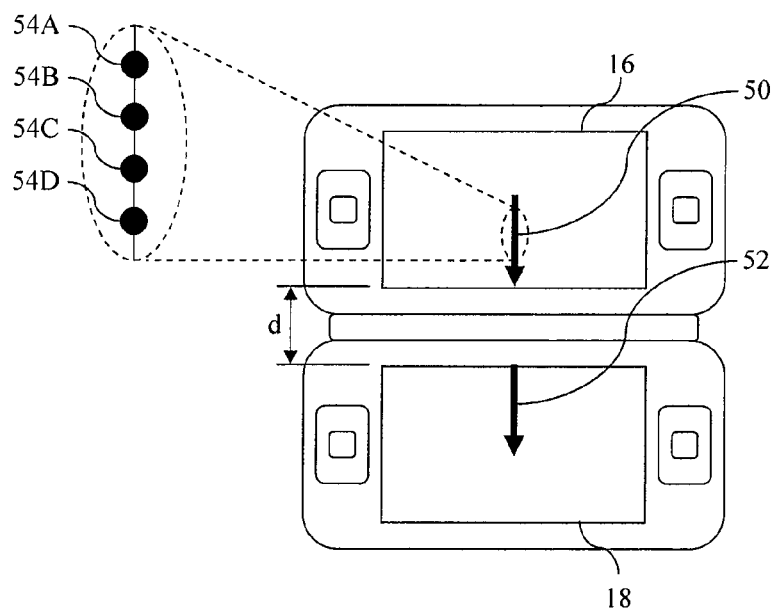
FIG. 3A illustrates schematically a gesture traversing two touch sensitive screens provided at a mobile device, like the device of FIG. 1A.
Figure 3B:
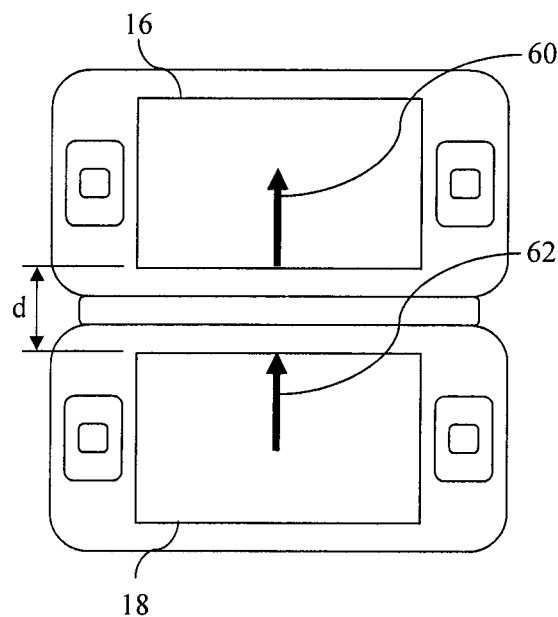
FIG. 3B illustrates schematically another gesture traversing two touch sensitive screens provided at a mobile device, like the device of FIG. 1A.
Figure 3C:
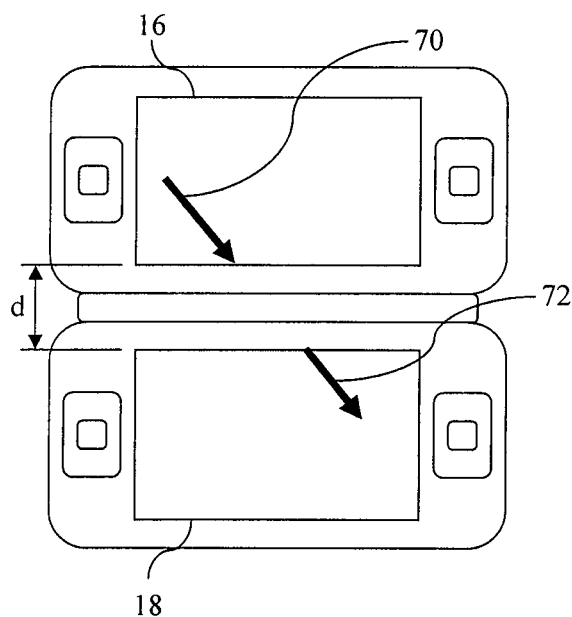
FIG. 3C illustrates schematically another gesture traversing two touch sensitive screens provided at a mobile device, like the device of FIG. 1A.

In more detail and with reference to FIG. 3A, a number of touches 54A, 54B, 54C, and 54D are detected over time and are determined to be a gesture. For example, the gesture 50, which is a slide movement in the direction of the arrow, is detected as a two or more touches 54A to 54D at the first touch sensitive screen 16. Other forms of gestures can also be tracked. For example, FIG. 3B illustrates another example where the slide gesture 62, 60 travels from the second touch sensitive screen 18 to the first touch sensitive screen 16. FIG. 3C illustrates a diagonal slide gesture 70, 72.

Referring back to FIG. 3A and in one example the touches 54A-54D are detected at the nodes of the touch screen as a change in capacitance. Each touch detection is also timestamped by the supporting electronics. The determined location of each touch along with the recorded time of each touch is used to determine whether the touches represent a gesture. For example, a processor and related memory (which is described in more detail below with reference to FIG. 6), temporarily store the detected touch data as historical data so that a gesture can be tracked. Using this information, it is also possible to calculate a speed and a direction of the gesture 50. In FIG. 3A the slide gesture 50 is continued onto the second touch sensitive screen 18 as slide gesture 52. As with slide gesture 50, the slide gesture 52 is detected as a number of touches over time, representing changes in touch position.

In order to treat what would normally be detected as two separate gestures as a single gesture, the time between when the last touch (e.g., touch 54D) is detected on the first touch screen 16 and the time when the first touch is detected on the second touch screen 18 is determined. Also, because the space "D" is a known quantity, the time approximately needed to traverse the space "D" can be calculated. These parameters, can be used to determine whether the gesture is a single gesture or more than one gesture. The historical data can also be used to predict where the next touch of the gesture will be in order to help determine whether one or more gestures should be detected. The data enables determination of whether a touch of the second screen is part of the current gesture or is a new gesture. For example if the last touch is detected at the bottom left of the first touch screen 16 and the first touch on the second touch screen 18 is detected at the top right corner thereof and the time until the first touch on the second touch screen 18 corresponds sufficiently to the estimated time difference, it is likely that the detections on the two screens should be treated as two separate gestures.

Figure 4:
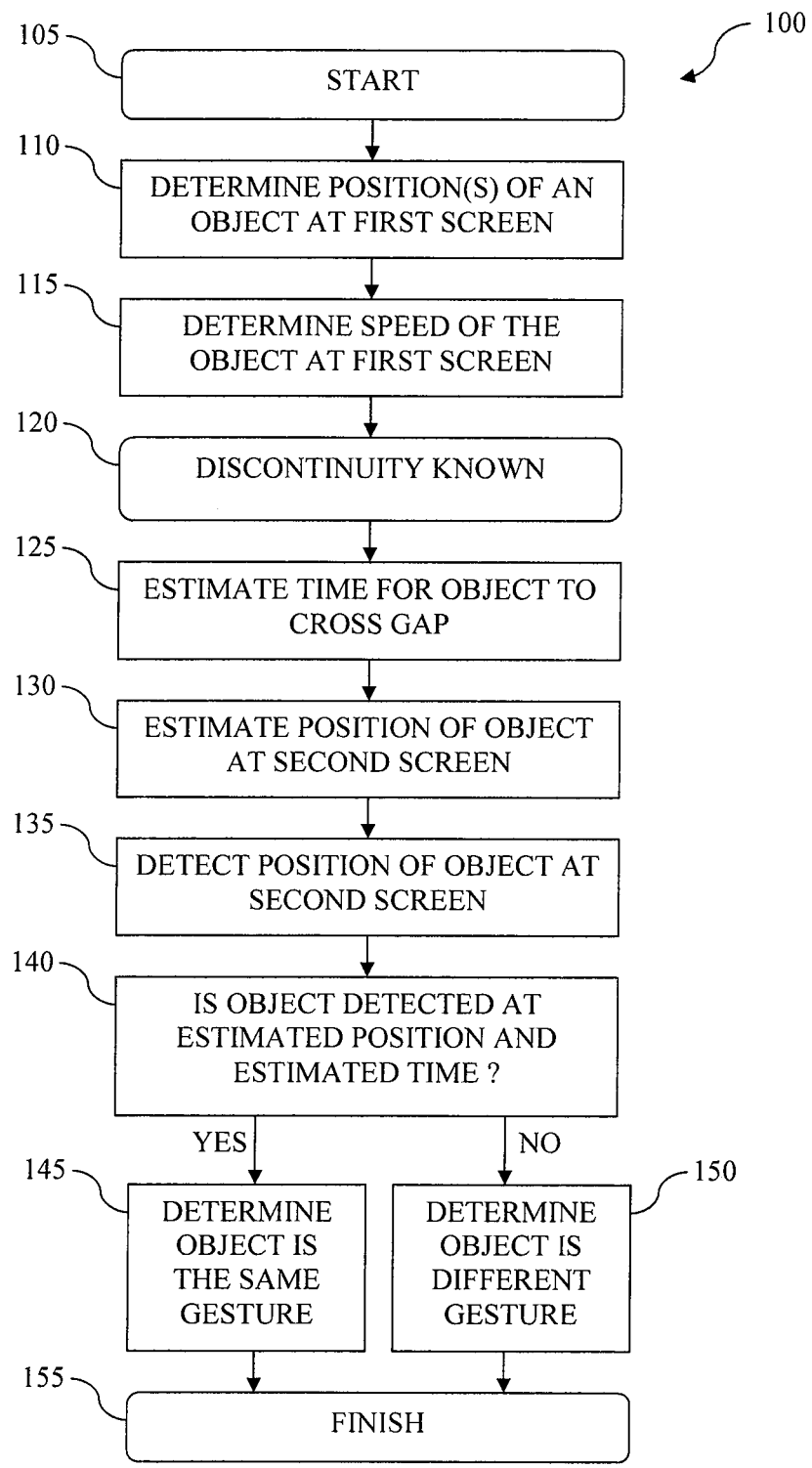
FIG. 4 is a flow chart of an example of a process for tracking a gesture which traverses two touch sensitive screens.

With reference to FIG. 4, a process 100 for tracking a gesture (such as illustrated in FIGS. 3A to 3C) that spans two or more touch sensitive screens separated by a gap is shown and described. Certain assumption are made by the process. For example, the spacing of the nodes, in the case of a mutual capacitance touch screen, is known. Also, the space "D" between the two touch screens is also known. The process 100 begins at step 105.

At step 110 at least two positions of touches associated with an object, such as a finger or a stylus, are determined at a first touch sensitive screen. For example, with reference to FIG. 3A, the position of each of the touches 54A to 54D are determined. The detected touches can be used to determine the approximate location of the object on the touch screen. As mentioned above, if the object is moving the location of the detected touches will change with time. The associated electronics can track the locations of the detected touches and determine whether a gesture is occurring and the touches should be treated as such. For example, a specific gesture may cause the mobile device 10 to perform an action such as turning a page of an e-book or moving a gaming piece in a certain direction.

The speed that the object is travelling across the first screen is then determined at step 115. It is possible to determine the speed using an equation based on the determined position of each touch and the time at which each touch occurred. Speed (S) is defined as the distance (d) travelled in meters (m) divided by the time (t) in seconds (s) taken to travel that distance.

$$S = \frac{d}{t} \quad \text{Equation 1}$$

For example, if the object moves 0.025 m in 0.5 s, from position 54A to position 54D in this example, it is determined at step 115, that the object is moving at a speed of 0.05 m/s. The distance travelled by the object from position 54A to position 54D can be determined because the spacing between the nodes of each of the touch screens is known. The spacing between the nodes of each screen can depend on the size and resolution of the touch screen that is used.

At step 120 the discontinuity between the touch sensitive screens of each device is known. In one example, the discontinuity is considered to be the distance "D" between the two screens (in FIG. 3A, the first screen 16 and the second screen 18). The discontinuity can also include a touch screen edge discontinuity component. A touch sensed at the edge of a screen as not as accurate as one sensed away from the edge of the screen, because at the edge of the screen there are not as many nodes. The edge discontinuity of each screen is known in advance as is the node spacing. The edge discontinuity can be used to improve the accuracy of the described gesture tracking. In one example, the discontinuity "D" may be 0.015 m. In other examples, the discontinuity of each device may vary from device to device.

An estimate is made at step 125 of the time required for the object to cross the gap between the two touch screens (the discontinuity "D"). Because the speed at which the object is travelling and the discontinuity "D" of the gap are both known, the time required to traverse the gap can be determined using Equation 1, rearranged as Equation 2 below.

$$t = \frac{d}{S} \quad \text{Equation 2}$$

Referring back to the example given above, if the object is travelling at a speed of 0.05 m/s at the first touch sensitive screen 16, and the discontinuity "D" between the first and second touch sensitive screens 16, 18 is 0.015 m, the estimated time to traverse the discontinuity is 0.3 seconds. Depending on the angle of the travel of the object, this calculation can be adjusted to increase the approximate traversal time.

The direction of travel of the object at the first touch sensitive screen is also known from the detected touches. This historical information can be used to estimate, at step 130, the position where the object will appear at the second touch screen.

For example, with reference to FIG. 3A again, because the last detected position of the object at the first touch sensitive screen 16, the direction of travel of the users finger/stylus, and the discontinuity between the first and second touch sensitive screens 16, 18 are known, it is possible to estimate the position and time at which the object should be detected at the second touch sensitive screen 18 after crossing the gap.

The actual position of the object at the second touch sensitive screen 18 is detected at step 135. At step 140 it is determined whether the object is detected at the estimated position at the second touch sensitive screen (determined at step 130) and whether the object is detected at the second touch screen within the estimated time to traverse the discontinuity. Step 140 may be performed as two separate steps. The first step determines if the object is detected at the estimated position at the second touch sensitive screen. The second step determines if the objected arrived at the second touch screen within the estimated time. Also, given that users may accelerate or decelerate as the object traverses the discontinuity the estimated locations and arrival times can include a error factor that adds or decreases the calculated time required to traverse the discontinuity.

The gesture is considered a single gesture, at step 145, when the object traverses the discontinuity within the pre-determined time and arrives in the pre-determined location. Again, a level of tolerance can be included to account for various user tendencies. However, if the object does not traverse the discontinuity within the pre-determined time or the object does not arrive at the pre-determined location, within the appropriate tolerance(s), then the object is determined to be performing a different gestures, at step 150.

The process ends at step 155.

In one example, another process is initiated when a gesture is predicted to cross the discontinuity. The process holds the touch detection at the first touch screen and initiates a timer. If a touch is not detected at the second touch screen within the estimated time, then hold of the touch detection at the first screen is released, because it is assumed that the two touches are not part of the same gesture or that there is only a single gesture as indicated by touches of the first screen. The algorithm is initiated when a tracked touch is predicted to be crossing the discontinuity between the touch screens.

Although the above description refers to a mobile device having two touch sensitive screens, the method of FIG. 4 could also be applied to a mobile device having more than two touch sensitive screens. In addition, although a mobile device has been described with the two or more touch sensitive screens, the method of FIG. 4 can also be applied any device provided with multiple touch sensitive screens. Examples include, but are not limited to computers, personal digital assistants (PDA), satellite navigation devices, mobile telephones, portable media players, portable game consoles, public information kiosks, point of sale systems, and control panels on various appliances.

Figure 5:
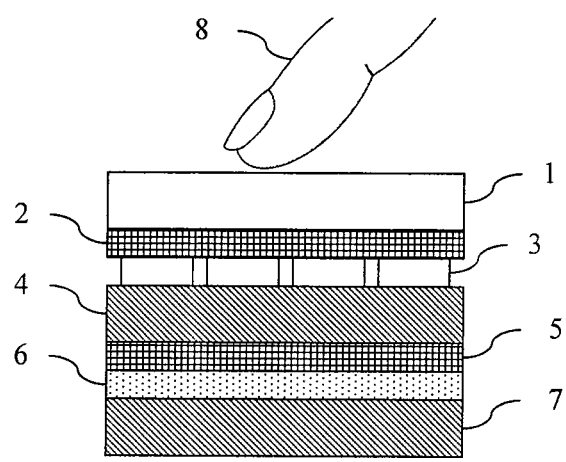
FIG. 5 illustrates schematically a side view of a touch sensitive screen.

FIG. 5 illustrates a side view of an exemplary touch sensitive screen. The touch sensitive screen of FIG. 5 is made up of a transparent panel 1, a first adhesive layer 2, a light transmissive conductive electrode layer 3, a first insulating substrate 4, a second adhesive layer 5, a second light transmissive conductive electrode layer 6, and a second insulating substrate 7.

The first conductive electrode layer 3 includes first (sense) electrodes, and the second conductive electrode layer 6 includes second (drive) electrodes. A number of nodes are formed at the intersections of the first electrodes and the second electrodes. The first and second electrodes can be configured to form any particular pattern as desired. In FIG. 5, the second electrodes are arranged perpendicular to the first electrodes such that only the side of one of the second electrodes is visible in the side view.

In one example, the transparent panel 10 is made of a resilient, transparent material suitable for repeated touching. Examples of the transparent material include glass, Polycarbonate or PMMA (poly(methyl methacrylate)). In one example, the first and second adhesive layers 2, 5 are made of any optically clear adhesive suitable for use in a touch panel. In one example, the first and second substrates 4, 7 are transparent materials, such as PET (polyethylene terephthalate), Polycarbonate, or glass. In one example, the first and second conductive electrode layers 3, 6 are made of PEDOT (Poly (3,4-ethylenedioxythiophene)) or ITO (indium tin oxide). In one example, the first and second conductive electrode layers 3, 6 are provided on the same substrate.

In an application with a display, the touch screen of FIG. 5 would be mounted over the exterior of the display device, for example, with the substrate 7 adjacent to the display device (not shown). The display may be of any type known to the skilled person, such as a liquid crystal (for example, active matrix liquid crystal), electroluminescent, electrophoretic (e-ink), plasma, or cathode-ray display. By way of example, in the illustrated orientation, the substrate 7 would be on top of the output surface of the display device. It will be appreciated that light emitted from the display must be able to pass through the position sensing panel in order to be visible to a user. Therefore, elements of the layer stack in aggregate are substantially transparent. Light produced or reflected from the display device, representing displayed information, passes through the elements of the layer stack (upward in the exemplary orientation) for observation of the information by a user. The user may touch the panel 1, as shown at 8, to provide input such as to select from the information shown on the display.

Figure 6:
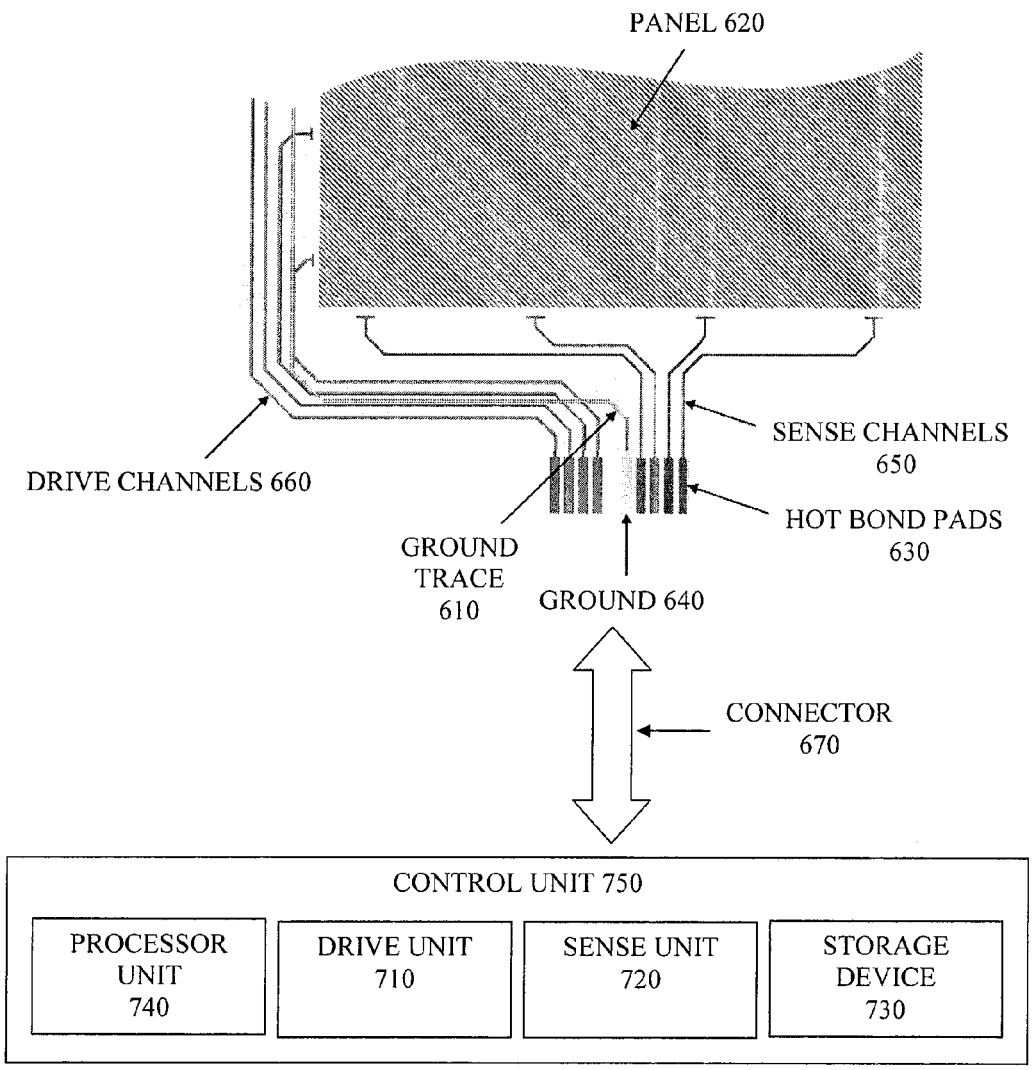
FIG. 6 illustrates schematically apparatus for detecting and processing touches at touch sensitive screens, including touches of a gesture that may traverse two touch sensitive screens.

A touch sensitive screen is supported by associated electronics that determine the location of the various touches. FIG. 6 illustrates schematically apparatus for detecting and processing a touch at a touch sensitive screen 620. In this example, the touch screen 620 has drive electrodes connected to drive channels 660 and sense electrodes connected to sense channels 650. The drive and sense channels 650, 660 are connected to a control unit 750 via a connector 670. The wiring traces also include a ground trace 610 having an associated ground connector 640. In the example, the traces forming the channels have hot bond pads 630, to facilitate electrical connection via the connector 670. The control unit 750 may be provided as a single integrated circuit chip such as a general purpose microprocessor, a microcontroller, a programmable logic device/array, an application-specific integrated circuit (ASIC), or a combination thereof. In one example the control unit 750 includes a drive unit 710, a sense unit 720, a storage device 730 and a processor unit 740. The processor unit 740 is capable of processing data from the sense unit 720 and determining a position of a touch. In one example, the drive unit 710, sense unit 720 and processor unit 740 may all be provided in separate control units.

In one example, each touch sensitive screen is connected to a control unit 750 for sensing the position of touches. The control units are then connected to an overall controller which includes a processor unit connected to a storage device provided with the algorithm for tracking gesture across two or more screens. In another example, one control unit is provided having a drive unit 710 and a sense unit 720 for each touch sensitive screen, but only one storage device 730 and one processor unit 740 are provided. The algorithm for tracking gestures across two or more screens is then provided at the storage device 730 for implementation by the processor unit 740. In another example, each touch sensitive screen is connected to a control unit 750 for sensing the position of touches and the coordination of these control units for tracking gestures across two or more screens is done in higher level logic.

As shown by the above discussion, at least some implementations for tracking a gesture across the boundary between two touch screens may involve programming, for example, for the processor unit in the touch screen control or for the processor of the mobile station or other device that incorporates the touch screens. Program aspects of the technology may be thought of as products or articles of manufacture typically in the form of executable code and/or associated data that is carried on or embodied in a type of machine readable medium. Storage type media include any or all of the memory of the supporting electronics of the touch screen, computing devices, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Hence, a machine readable medium may take many forms, including but not limited to, a tangible non-transitory storage medium, a carrier wave medium or physical transmission medium. Tangible non-volatile storage media include, for example, optical or magnetic disks, such as any of the storage devices in any computer(s) or the like. Tangible volatile storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for execution Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

The invention claimed is:

1. A method comprising:
   sensing a plurality of touches of a first touch sensitive screen made by an object over time, the plurality of touches of the first touch sensitive screen made by the object representing a gesture;
   determining that the object may cross a discontinuity in continuing the gesture, the discontinuity being between the first touch sensitive screen and a second touch sensitive screen;
   calculating an estimated time for the object to cross the discontinuity based at least in part on the speed of the object at the first touch sensitive screen;
   approximating the location where the object should be detected at the second touch sensitive screen in continuation of the gesture;
   categorizing the gesture as a single gesture when the second touch sensitive screen detects the object within the estimated time and at the approximate location; and
   determining that the object is not making a single gesture when the object is not detected within the estimated time at the second touch sensitive screen.

2. The method of claim 1 wherein approximating the location where the object should be detected at the second touch sensitive screen is based at least in part on the direction of travel of the object at the first touch sensitive screen.

3. The method of claim 1 further comprising determining that the object is not making a single gesture when the object is not detected in the approximated location of the second touch sensitive screen.

4. A touch sensor comprising:
   a first touch sensitive screen;
   a second touch sensitive screen, separated from the first touch sensitive screen by a discontinuity; and
   control circuitry in communication with the first touch sensitive screen and the second touch sensitive screen, the control circuitry configured to:
   sense a plurality of touches of the first touch sensitive screen made by an object over time, the plurality of touches of the first touch sensitive screen made by the object representing a gesture;
   determine that the object may cross the discontinuity in continuing the gesture;
   calculate an estimated time for the object to cross the discontinuity based at least in part on the speed of the object at the first touch sensitive screen;
   approximate the location where the object should be detected at the second touch sensitive screen in continuation of the gesture;
   categorize the gesture as a single gesture when the second touch sensitive screen detects the object within the estimated time and at the approximate location; and
   determine that the object is not making a single gesture when the object is not detected within the estimated time at the second touch sensitive screen.

5. The touch sensor of claim 4 wherein at least one of the first and second touch sensitive screens is a mutual capacitance touch sensitive screen.

6. The touch sensor of claim 4 wherein the control circuitry is configured to approximate the location where the object should be detected at the second touch sensitive screen based at least in part on the direction of travel of the object at the first touch sensitive screen.

7. The touch sensor of claim 4 wherein the control circuitry is further configured to determine that the object is not making a single gesture when the object is not detected in the approximated location of the second touch sensitive screen.

8. A mobile device comprising:
a first touch sensitive screen at a first location on a housing, and a second touch sensitive screen, the second touch sensitive screen being separated from the first touch sensitive screen by a discontinuity; and
control circuitry in communication with the first touch sensitive screen and the second touch sensitive screen, the control circuitry configured to:
sense a plurality of touches of the first touch sensitive screen made by an object over time, the plurality of touches of the first touch sensitive screen made by the object representing a gesture;
determine that the object may cross the discontinuity in continuing the gesture;
calculate an estimated time for the object to cross the discontinuity based at least in part on the speed of the object at the first touch sensitive screen;
approximate the location where the object should be detected at the second touch sensitive screen in continuation of the gesture;
categorize the gesture as a single gesture when the second touch sensitive screen detects the object within the estimated time and at the approximated location; and
determine that the object is not making a single gesture when the object is not detected within the estimated time at the second touch sensitive screen.

9. The mobile device of claim 8, wherein the housing includes cellular telephone circuitry.

10. The mobile device of claim 8, wherein the control circuitry is configured to approximate the location where the object should be detected at the second touch sensitive screen based at least in part on the direction of travel of the object at the first touch sensitive screen.

11. The mobile device of claim 8, wherein the control circuitry is further configured to determine that the object is not making a single gesture when the object is not detected in the approximated location of the second touch sensitive screen.

12. The mobile device of claim 8, wherein at least one of the first and second touch sensitive screens is a mutual capacitance touch sensitive screen.

13. A touch sensitive panel controller, comprising:
a processor configured to a communicate with a first touch sensitive screen and second touch sensitive screen separated by a discontinuity, the processor configured to execute instructions that cause the processor perform the functions to track a gesture generated by an object across the first and second touch sensitive screens, comprising functions to:
sense a plurality of touches of the first touch sensitive screen made by the object over time, the plurality of touches of the first touch sensitive screen made by the object representing the gesture generated by the object;
determine that the object may cross the discontinuity in continuing the gesture;
calculate an estimated time for the object to cross the discontinuity based at least in part on the speed of the object at the first touch sensitive screen;
approximate the location where the object should be detected at the second touch sensitive screen in continuation of the gesture;
categorize the gesture as a single gesture when the second touch sensitive screen detects the object within the estimated time and at the approximate location; and
determine that the object is not making a single gesture when the object is not detected within the estimated time at the second touch sensitive screen.

14. The touch sensitive panel controller of claim 13 wherein, the approximation of the location where the object should be detected at the second touch sensitive screen is based at least in part on the direction of travel of the object at the first touch sensitive screen.

15. The touch sensitive panel controller of claim 13 wherein the processor further performs the function of determining that the object is not making a single gesture when the object is not detected in the approximated location of the second touch sensitive screen.

16. The touch sensitive panel controller of claim 13, wherein at least one of the first and second touch sensitive screens is a mutual capacitance touch sensitive screen.

17. An article of manufacture comprising:
a non-transitory machine readable storage medium; and
executable program instructions embodied in the machine readable storage medium that when executed by a processor of a programmable computing device configures the programmable computing device having a first touch sensitive screen and second touch sensitive screen separated by a discontinuity to perform functions to track a gesture generated by an object across the first and second touch sensitive screens, including functions to:
sense a plurality of touches of the first touch sensitive screen made by the object over time, the plurality of touches of the first touch sensitive screen made by the object representing the gesture generated by the object;
determine that the object may cross the discontinuity in continuing the gesture;
calculate an estimated time for the object to cross the discontinuity based at least in part on the speed of the object at the first touch sensitive screen;
approximate the location where the object should be detected at the second touch sensitive screen in continuation of the gesture;
categorize the gesture as a single gesture when the second touch sensitive screen detects the object within the estimated time and at the approximate location; and
determine that the object is not making a single gesture when the object is not detected within the estimated time at the second touch sensitive screen.

18. The article of manufacture of claim 17, wherein the approximate location where the object should be detected at the second touch sensitive screen is based at least in part on the direction of travel of the object at the first touch sensitive screen.

19. The article of manufacture of claim 17, wherein the processor is further configured to determine that the object is not making a single gesture when the object is not detected in the approximated location of the second touch sensitive screen.

20. The article of manufacture of claim 17, wherein at least one of the first and second touch sensitive screens is a mutual capacitance touch sensitive screen.

* * * * *